United States Patent
Stahl et al.

(10) Patent No.: US 8,485,403 B2
(45) Date of Patent: Jul. 16, 2013

(54) ROOF RACK ASSEMBLY WITH STOWABLE CROSS MEMBERS

(75) Inventors: Glenn E. Stahl, White Lake, MI (US); Joseph M. Polewarczyk, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 980 days.

(21) Appl. No.: 12/057,028

(22) Filed: Mar. 27, 2008

(65) Prior Publication Data

US 2009/0242599 A1    Oct. 1, 2009

(51) Int. Cl.
*B60R 9/04* (2006.01)

(52) U.S. Cl.
USPC ............ 224/321; 224/325; 224/326; 224/553

(58) Field of Classification Search
USPC ................. 224/321, 322, 324, 325, 326, 549, 224/553, 554, 924
See application file for complete search history.

(56) References Cited

U.S. PATENT DOCUMENTS

| | | | |
|---|---|---|---|
| 5,340,007 A * | 8/1994 | Jeuffray et al. | 224/321 |
| 5,377,890 A * | 1/1995 | Brunner et al. | 224/321 |
| 5,511,709 A * | 4/1996 | Fisch | 224/321 |
| 5,715,980 A * | 2/1998 | Blankenburg et al. | 224/321 |
| 5,732,863 A * | 3/1998 | Stapleton | 224/321 |
| 6,286,739 B1 * | 9/2001 | Stapleton | 224/321 |
| 6,811,066 B2 * | 11/2004 | Aftanas et al. | 224/321 |
| 6,959,845 B2 * | 11/2005 | Aftanas et al. | 224/321 |
| 7,066,364 B2 * | 6/2006 | Kmita et al. | 224/321 |
| 7,090,103 B2 * | 8/2006 | Aftanas et al. | 224/321 |
| 2006/0163297 A1 * | 7/2006 | Moreau | 224/321 |

FOREIGN PATENT DOCUMENTS

| | | | |
|---|---|---|---|
| GB | 2420766 A * | 6/2006 | |
| JP | 1128982 A | 2/1999 | |
| JP | 11028982 A * | 2/1999 | |
| WO | 9804436 A1 | 2/1998 | |

* cited by examiner

*Primary Examiner* — Nathan J Newhouse
*Assistant Examiner* — Corey Skurdal
(74) *Attorney, Agent, or Firm* — Quinn Law Group, PLLC

(57) ABSTRACT

A roof rack assembly for a vehicle is provided with a first and a second elongated roof rail substantially parallel and spaced from one another. An elongated cross member is secured to the first roof rail and configured to be selectively securable to the second roof rail. The cross member is pivotable between a stowed position and a use position, also referred to as a deployed position. The cross member is substantially parallel with the first roof rail and is not secured to the second roof rail in the stowed position, and not parallel with the first roof rail and secured to the second roof rail in the use position. In the stowed position, the cross member may be within a cavity defined by the roof rail. Two cross members may be used, each being stowable in a different one of the roof rails.

12 Claims, 6 Drawing Sheets

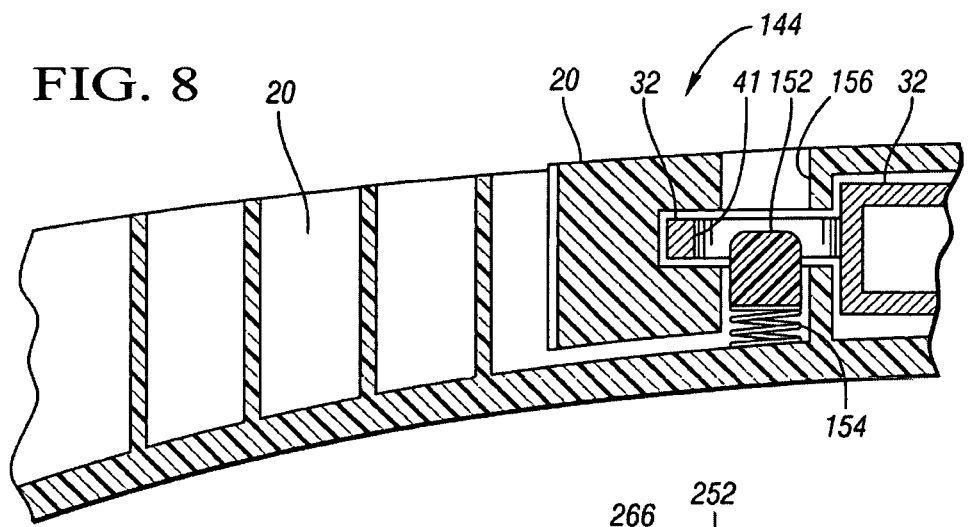
FIG. 8
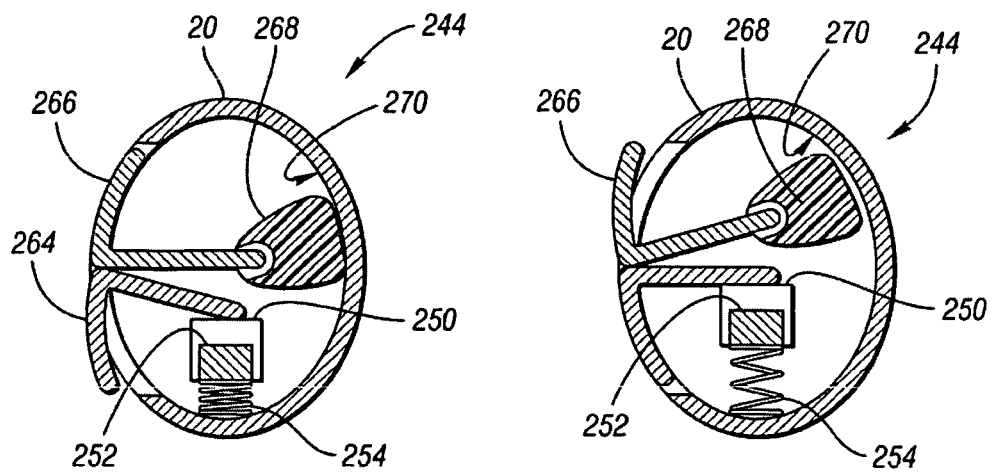
FIG. 9
FIG. 10A
FIG. 10B

ROOF RACK ASSEMBLY WITH STOWABLE CROSS MEMBERS

TECHNICAL FIELD

The invention relates to a roof rack assembly with cross members selectively stowable in roof rails.

BACKGROUND OF THE INVENTION

Roof rack assemblies are often secured to vehicle roofs for supporting cargo above the roof. Roof rack assemblies often have longitudinally arranged roof rails. Transverse cross members, sometimes referred to as cross bows may be used to span the distance between the roof rails. The entire roof rack assembly, and specifically the cross members, must be carefully designed to limit any aerodynamic drag.

SUMMARY OF THE INVENTION

A roof rack assembly for a vehicle is provided with a first and a second elongated roof rail substantially parallel and spaced from one another. An elongated cross member, which may also be referred to as a cross bow, is secured to the first roof rail and configured to be selectively securable to the second roof rail. The cross member is pivotable between a stowed position and a use position, also referred to as a deployed position. The cross member is substantially parallel with the first roof rail and is not secured to the second roof rail in the stowed position, and the cross rail is not parallel with the first roof rail and is secured to the second roof rail in the use position. In the stowed position, the cross member may be within a cavity defined by the roof rail. Two cross members may be used, each being stowable in a different one of the roof rails. Various embodiments of locking mechanisms may be used to secure end portions of the cross members to the roof rails. In some embodiments, a mounting mechanism is used that is slidable within the roof rail cavity to allow the fore/aft position of the cross member to be adjusted.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 8 is a schematic cross-sectional perspective illustration in partially cross-sectional and fragmentary view of an alternative embodiment of a locking mechanism that may be used in the roof rail of FIG. 5 to secure the cross member to the roof rail;

FIG. 9 is a schematic perspective fragmentary view of the roof rail of FIG. 5 with a mounting mechanism slidable within the roof rail to allow adjustment of the fore/aft position of the cross member; and FIG. 10A is a schematic cross sectional view of the mounting mechanism of FIG. 9 with a first lever depressing a release button; and FIG. 10B is a schematic cross sectional view of the mounting mechanism of FIG. 9 with a second lever releasing a wedge to allow sliding of the mounting mechanism along the roof rail.

DESCRIPTION OF THE PREFERRED EMBODIMENTS

Figure 1:
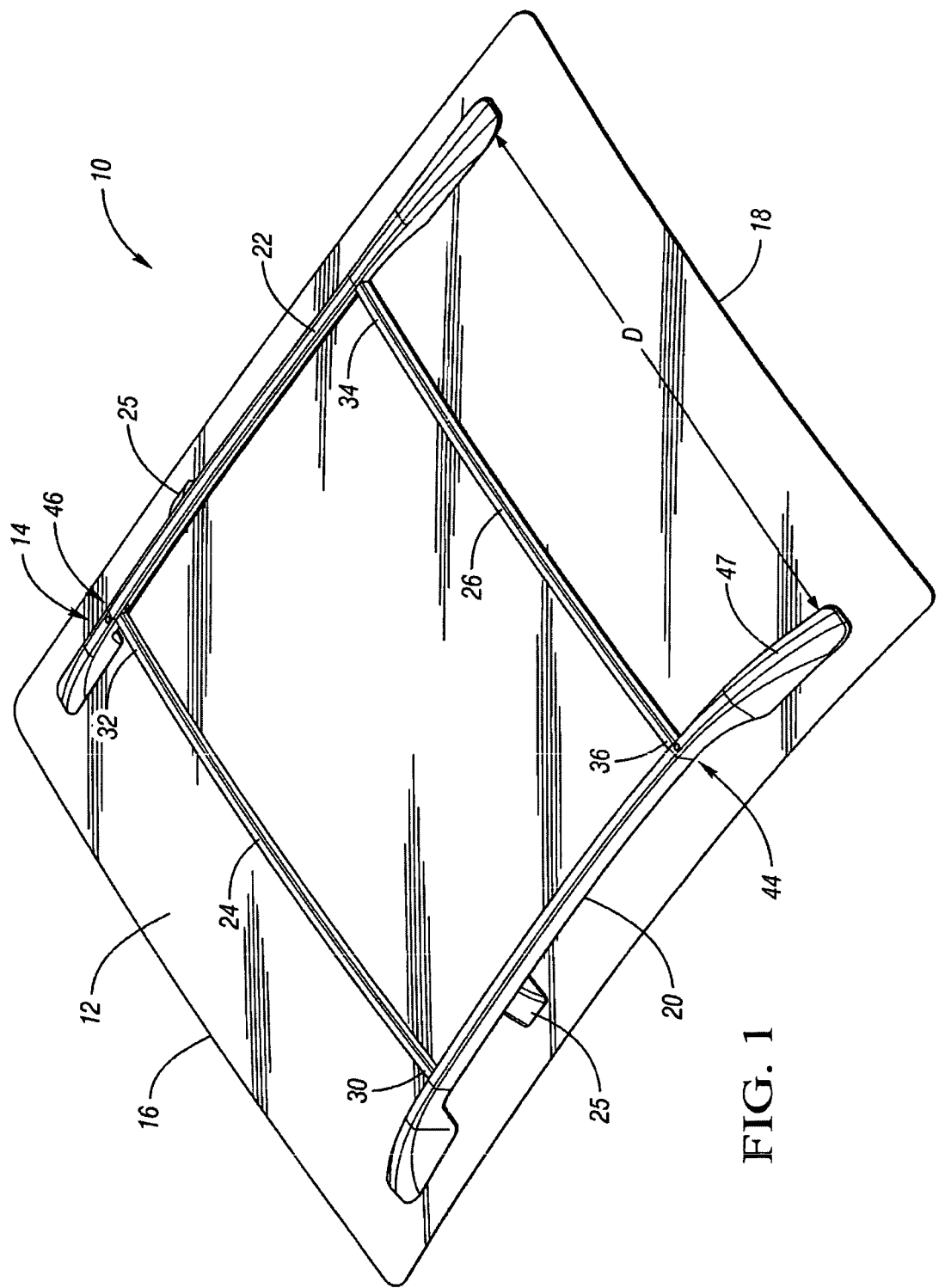
FIG. 1 is a schematic perspective illustration of a roof rack assembly on a vehicle roof with cross members in a deployed position.

Referring to the drawings, wherein like reference numbers refer to like components, FIG. 1 shows a vehicle 10 represented by a roof 12 having a roof rack assembly 14 secured thereto. The front of the vehicle roof, i.e., that portion that is generally forward when the vehicle is driven in a forward direction is indicated as 16, while the rear of the vehicle roof is indicated as 18.

The roof rack assembly 14 includes a first elongated roof rail 20 and a second elongated roof rail 22, both extending in a generally fore/aft or longitudinal direction on the vehicle 10. The roof rails 20, 22 arch upward slightly from the roof at a midportion that is supported by a mount 25 secured to the roof 12. The roof rails 20, 22 are parallel with one another and spaced by a transverse distance D that is spanned by a first elongated cross member 24 and a second elongated cross member 26. The cross members 24, 26 are shown in a "use position", also referred to as a deployed position, ready to support cargo (not shown). In the use position, the cross members 24, 26 are substantially parallel with one another and substantially perpendicular to the roof rails 20, 22.

Figure 6:
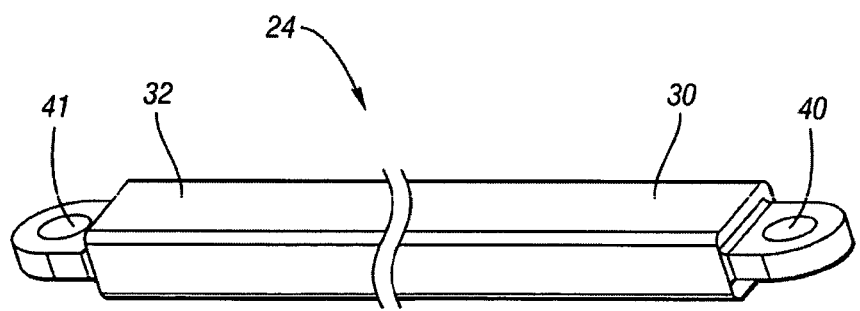
FIG. 6 is a schematic perspective illustration in fragmentary view of the end portion of the cross member of FIG. 4B.

The first cross member 24 has a first end portion 30 and a second end portion 32. The second cross member 26 has a third end portion 34 and a fourth end portion 36. The end portions 30, 32, 34 and 36 are substantially identical to one another, each having an opening 40 as shown on end portion 30 of cross member 24 in FIG. 6. Openings 40 on the other end portions 32, 34 and 36 are not visible in FIG. 1, but are substantially identical to that shown with respect to end portion 30 in FIG. 6. By providing substantially identical end portions 30, 32, 34 and 36, the cross members 24 and 26 may be switched in placement with one another (i.e., cross member 26 may be forward of cross member 24) and each cross member may be installed such that its end portions are "flipped", e.g., the cross member 24 may be installed so that end portion 30 is secured to roof rail 22 and end portion 32 is secured to roof rail 30. This versatility may simplify and shorten installation time of the cross members 24, 26.

Figure 2:
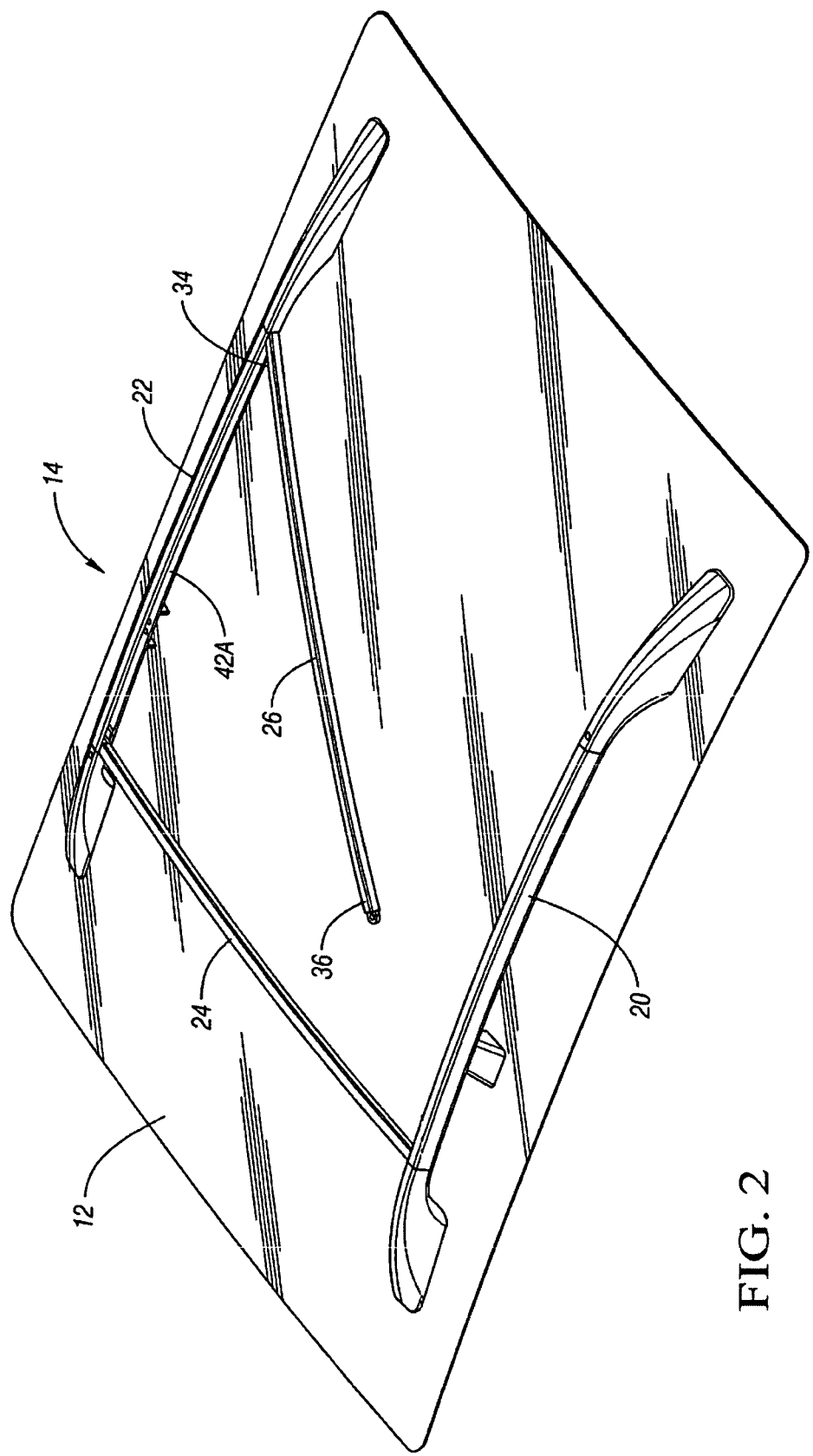
FIG. 2 is a schematic perspective illustration of the roof rack of FIG. 1 showing one of the cross members being pivoted to a stowed position.
Figure 3:
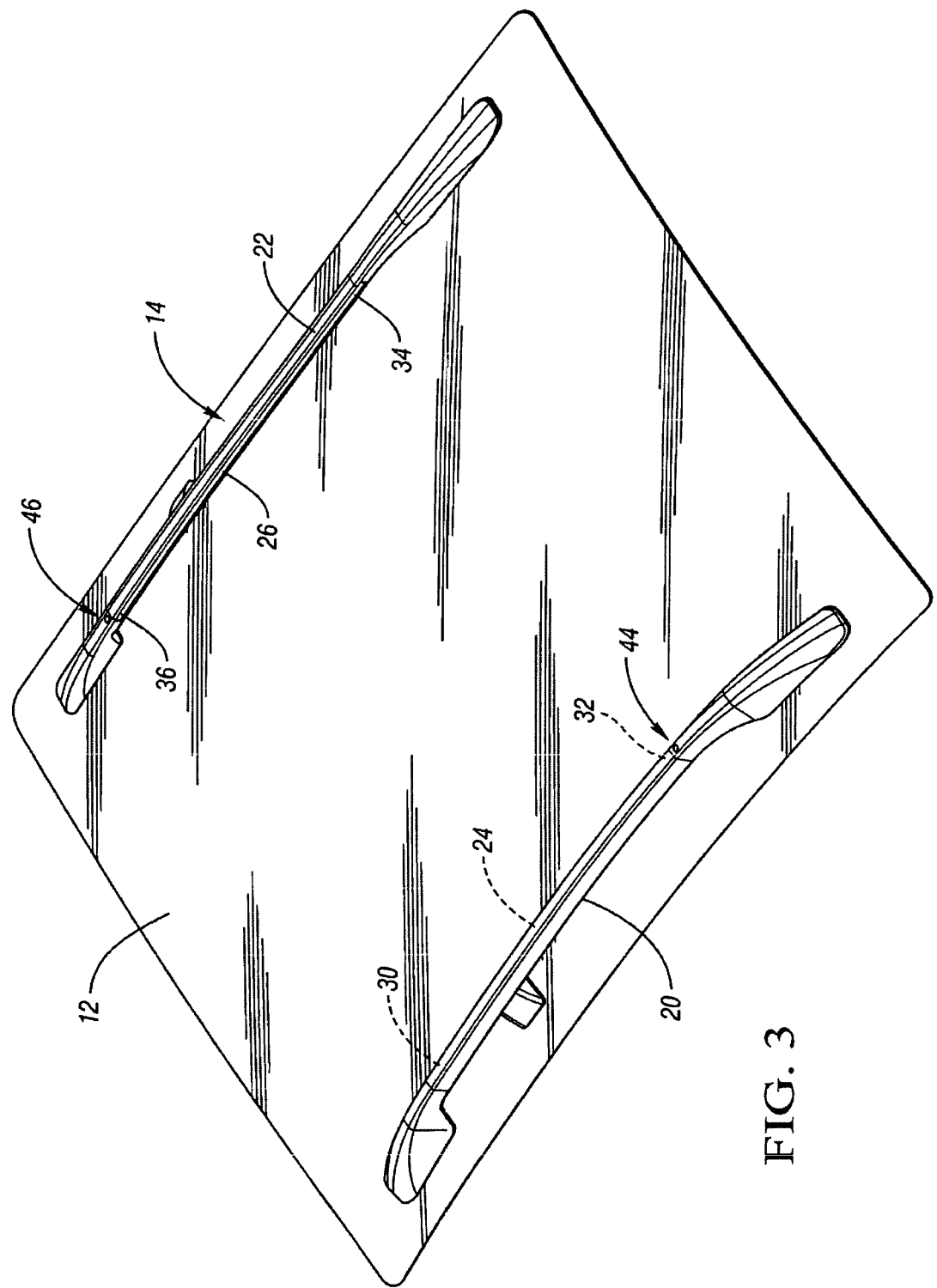
FIG. 3 is a schematic perspective illustration of the roof rack of FIGS. 1 and 2 showing the cross members in stowed positions.
Figure 4A:
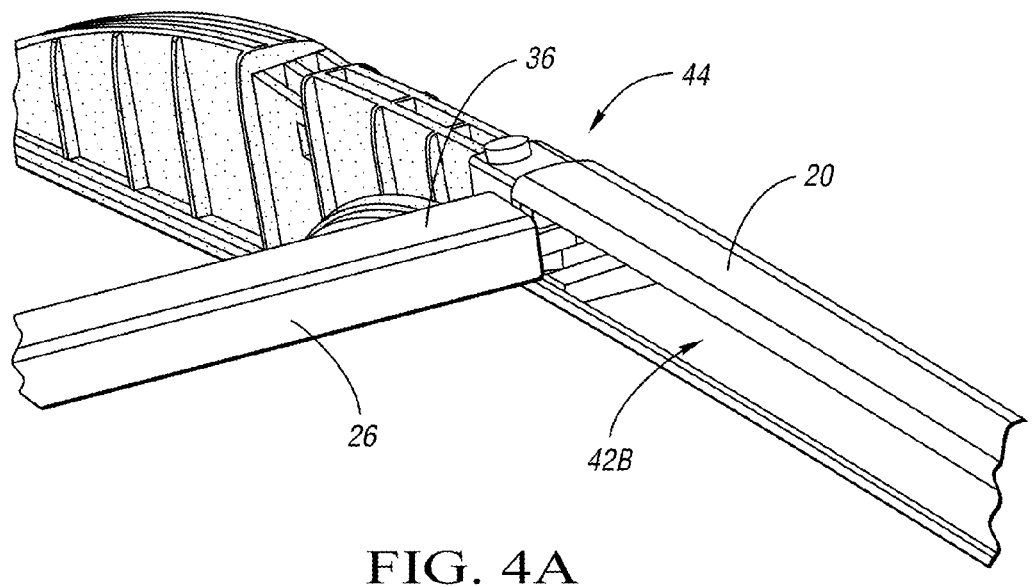
FIGS. 4A and 4B are schematic perspective illustrations in fragmentary view showing end portions of the cross members of FIGS. 1-3 secured to the roof rails and in the deployed position.
Figure 5:
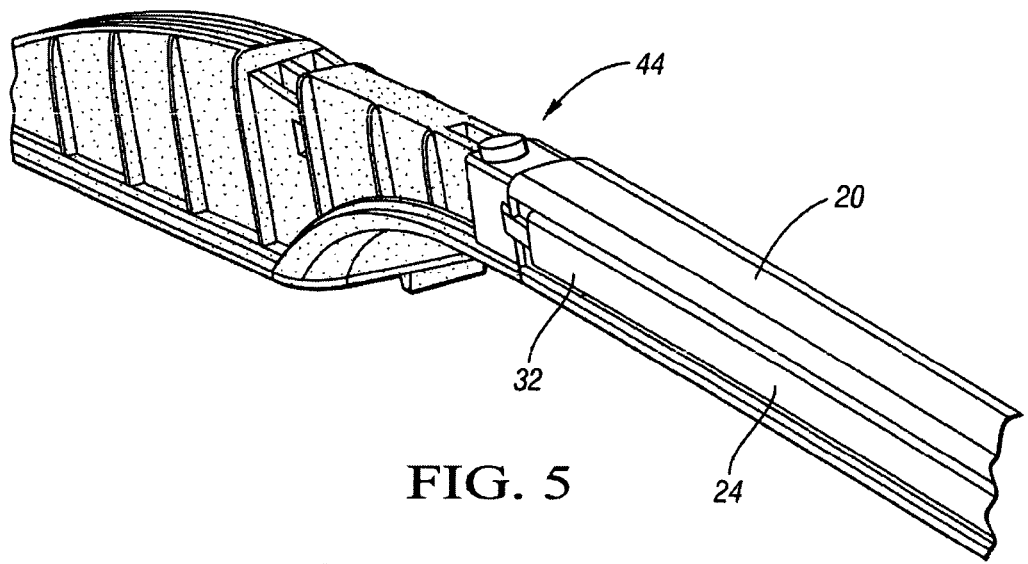
FIG. 5 is a schematic perspective illustration in fragmentary view showing an end portion of one of the cross members of FIGS. 1-3 and 4B secured to one of the roof rails and in the stowed position.

Referring to FIG. 2, cross member 26 is shown partially pivoted about end portion 34 from the use position toward a stowed position in which the cross member 26 will be nested within a cavity 42A formed in the roof rail 22. In FIG. 3, the cross member 26 has been pivoted completely about end portion 34 and is in the stowed position. In FIG. 3, cross member 24 has been pivoted about end portion 30 to the stowed position in which it is nested within a cavity 42B, as shown in FIG. 5 (cavity 42B best shown in FIG. 4A. (Cavity 42A is a mirror image of cavity 42B, and thus need not be shown in greater detail than in FIG. 2 in order for one of ordinary skill in the art to understand roof rack assembly 14.) Thus, the cross members 24, 26 pivot about respective end portions 30, 34 that are diagonally opposite one another.

Figure 4B:
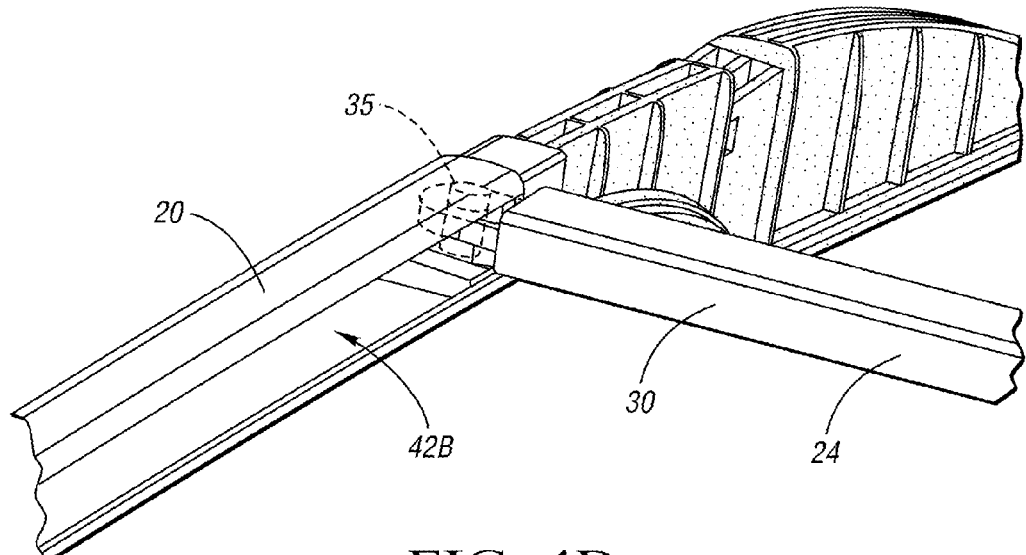

As shown in phantom in FIG. 4B, a stationary pin 35 secured to the roof rail 20 establishes a pivot point for end portion 30. A similar pin (not shown) is secured to roof rail 22 to establish a pivot pint for end portion 34.

A first releasable locking mechanism 44, discussed further below, is retained within the roof rail 20 and selectively secures end portion 32 within the roof rail 20 when the cross member 24 is in the stowed position and selectively secures the end portion 36 when cross member 26 is in the use position. A second releasable locking mechanism 46, substantially identical with locking mechanism 44, is retained within the roof rail 22 and selectively secures end portion 36 within the roof rail 22 when the cross member 26 is in the stowed position and selectively secures the end portion 32 when cross member 24 is in the use position.

The locking mechanism 44 and the stationary pin securing end portion 34 may be vertically offset from the locking mechanism 46 and the stationary pin 35 securing end portion 30 so that the cross members 24, 26 do not physically interfere with one another when being pivoted between the use and stowed positions. Alternatively, the stationary pins 35 at end portions 30, 34 may be replaced by locking mechanisms identical to locking mechanisms 44, 46. This would permit the cross members 24, 26 to be completely removed from the roof rails 20, 22, as each of the end portions 30, 32, 34 and 36 would then be releasable. Such an embodiment may be desirable for increased fuel savings, as the cross members 24, 26 could be removed from the vehicle, rather than stored in the roof rails 20, 22, when there are no cargo-carrying needs.

Figure 7:
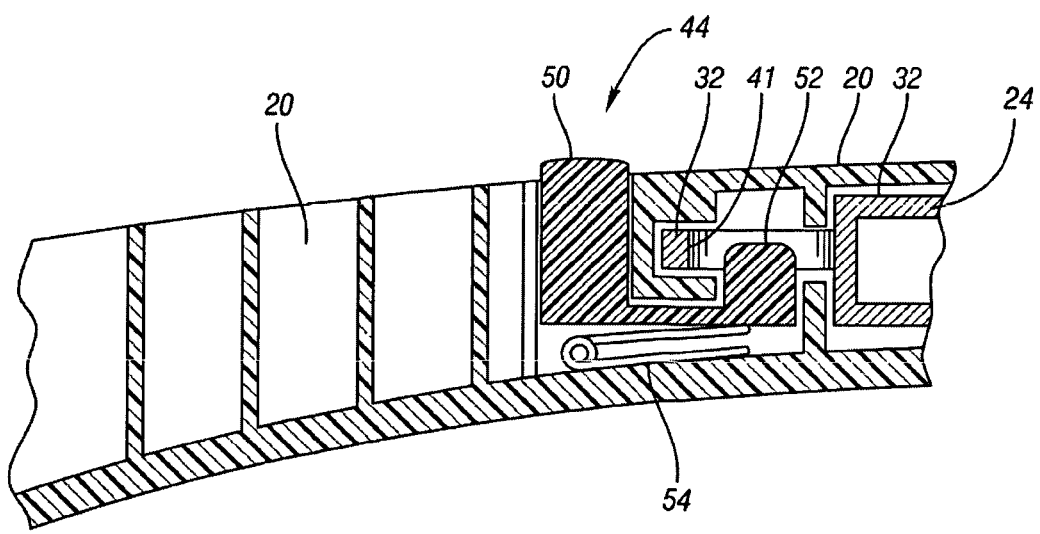
FIG. 7 is a schematic cross-sectional perspective illustration in partially cross-sectional and fragmentary view of the roof rail of FIG. 5 show a first embodiment of a locking mechanism securing the cross member to the roof rail.

Referring to FIG. 7, a portion of the roof rail 20 (shown with cover 47 of FIG. 1 removed) is shown in partial cross-section to expose the locking mechanism 44. The locking mechanism 44 includes a push button 50 (also shown in FIG. 1) that may be depressed to vertically translate pin 52. In FIG. 7, the button 50 is shown in a partially depressed position so that pin 52 is partially extending through the opening in end portion 32 of cross member 24, which is in the stowed position. A spring 54 biases the button 50 and 52 upward so that the cross member 24 will remain locked unless selectively released. To release the cross member 24 so that it may be pivoted about end portion 30 (not shown in FIG. 7), end portion 32 may be released from locking mechanism 44 by pushing button 50 further downward than shown in FIG. 7 so that pin 52 does not extend through the opening 41 in the end portion 32 and end portion 32 clears the pin 52 and may be pivoted out of locking mechanism 44. This locking mechanism 44 also releasably secures end portion 36 when cross member 26 is in the use position.

Referring to FIG. 8, an alternative locking mechanism 144 is shown that may be used in place of locking mechanism 44 of FIGS. 1 and 7 and locking mechanism 46 of FIG. 1. Locking mechanism 144 includes a combined push button and pin 152 that is depressible through a through hole opening 156 formed in the roof rail 20 to overcome a biasing spring 154 to allow the opening 41 of end portion 32 to clear the combined push button and pin 152. This type of combined push button and pin is similar to those used on umbrellas. This locking mechanism 144 also releasably secures end portion 36 when cross member 26 is in the use position.

Referring to FIG. 9, yet another embodiment of a locking mechanism in the form of mounting mechanism 244 is shown releasably securing end portion 36 of cross member 26 to the roof rail 20. Mounting mechanism 244 is a slidable locking mechanism, and is able to slide fore and aft within the cavity 42B to allow fore/aft adjustment of the position of the deployed cross member 26. Similar mounting mechanisms would need to be employed to secure end portion 30 to roof rail 20 and end portions 34 and 36 to roof rail 22 so that both of the cross members 24, 26 are adjustable fore and aft. When in the stowed position, the mounting mechanisms 244 would need to be slid to the respective ends of the cavities 42A, 42B to allow the entire length of the cross members 24, 26 to be stowed. In FIG. 9, mounting mechanism 244 is slid partially forward toward the front portion 16 of FIG. 1 from an end position. Upper and lower extensions 260A, 260B ride in grooves 262 (only lower groove shown; upper groove that extension 260A rides in being substantially identical) formed in rail 20.

The mounting mechanism 244 includes a lower lever 264 that may be selectively pressed upward from a lower edge thereof to depress button 250 to selectively release end portion 36 from translatable pin 252 by moving pin 252 downward to clear the opening 43 of end portion 36. As best shown in FIG. 10A, the lever 264 contacts button 250 axially displaced from but integral with pin 252 to overcome a bias of spring 254 when releasing cross member 26. As shown in FIG. 10B, the button 250 and pin 252 are normally biased by spring 254 to an elevated position in which the cross member 26 is secured, as illustrated in FIG. 9. Referring again to FIG. 10A, upper lever 266 is shown in an undepressed position in which a wedge feature 268 is tightened to an inner surface 270 of the roof rail 20. When the lever is pulled outward, as shown in FIG. 10B, the wedge feature 268 is pulled away from the surface 270, allowing the mounting mechanism 244 to slide within the roof rail 20.

While the best modes for carrying out the invention have been described in detail, those familiar with the art to which this invention relates will recognize various alternative designs and embodiments for practicing the invention within the scope of the appended claims.

The invention claimed is:

1. A roof rack assembly for a vehicle, comprising:
a first and a second elongated roof rail substantially parallel and spaced from one another;
an elongated cross member secured to the first roof rail and configured to be selectively securable to the second roof rail; wherein the cross member is pivotable between a stowed position and a use position; wherein the cross member is substantially parallel with the first roof rail and is not secured to the second roof rail in the stowed position; wherein the cross rail is not parallel with the first roof rail and is secured to the second roof rail in the use position; wherein the cross member has a first and a second opening therethrough, wherein the first and the second openings are spaced from one another along the cross member;
wherein the first roof rail is substantially U-shaped to at least partially define a cavity; and wherein the cross member is configured to be nested within the cavity when in the stowed position so that the first roof rail partially surrounds the cross member;
a first pin secured to the first roof rail and extending through the first opening of the cross member to secure the cross member to the first roof rail;
a first locking mechanism connected to the first roof rail, spaced from the first pin, and selectively lockable to further secure the cross member to the first roof rail at the second opening and selectively releasable to permit pivoting of the cross member about the first pin; and a second locking mechanism connected to the second roof rail and selectively lockable to secure the cross member to the second roof rail at the second opening such that the cross rail extends between the roof rails in the use position, and selectively releasable to permit the cross member to pivot about the first pin back to the stowed position;

wherein the first and second locking mechanisms each include a respective translatable pin configured to be selectively movable between a locked position in which the respective translatable pin extends through the second opening to further secure the cross member to the respective first and second roof rails, and a release position in which the respective translatable pin does not extend through the second opening; and wherein the translatable pin of the first locking mechanism extends through the second opening when the cross member is in the stowed position, and the translatable pin of the second locking mechanism extends through the second opening when the cross member is in the use position.

2. The roof rack assembly of claim 1, further comprising:
respective mounting mechanisms, each supporting a respective one of the locking mechanisms or the first pin; wherein the mounting mechanisms are configured to be selectively slidable along the respective roof rails to a respective selected cross member position and selectively lockable to the respective roof rails at the respective selected cross member position.

3. The roof rack assembly of claim 1, wherein the cross member is a first cross member, and further comprising:
an elongated second cross member secured to the second roof rail and configured to be selectively securable to the first roof rail; wherein the second cross member is pivotable between a stowed position and a use position; wherein the second cross member is substantially parallel with the second roof rail and is not secured to the first roof rail in the stowed position; and wherein the second cross member is not parallel with the second roof rail and is secured to the first roof rail in the use position.

4. The roof rack assembly of claim 2, wherein the mounting mechanism supporting the second locking mechanism is configured so that the second locking mechanism slides with the mounting mechanism supporting the second locking mechanism.

5. The roof rack assembly of claim 4, wherein each of the mounting mechanisms includes a respective wedge feature and a respective lever operatively connected to the wedge feature; and wherein moving the lever wedges the wedge feature to the respective roof rail to lock the cross member to the roof rail.

6. A roof rack assembly for a vehicle roof, comprising:
a first and a second elongated roof rail substantially parallel with one another to define a transverse distance therebetween;

a first cross member having a first end portion and a second end portion opposing the first end portion; wherein the first cross member is secured to the first roof rail at the first end portion and is configured to be pivotable at the first end portion from a stowed position to a use position; wherein the first cross member is nested within the first roof rail generally parallel therewith and selectively secured to the first roof rail at the second end portion in the stowed position; wherein the first cross member is selectively secured to the second roof rail at the second end portion and spans the transverse distance in the use position;

a second cross member having a third end portion and a fourth end portion opposing the third end portion; wherein the second cross member is secured to the second roof rail at the third end portion diagonally across the roof from the first end portion of the first cross member and is configured to be pivotable at the third end portion from a stowed position to a use position; wherein the second cross member is nested within the second roof rail generally parallel therewith and selectively secured to the second roof rail at the fourth end portion in the stowed position; wherein the second cross member is selectively secured to the first roof rail at the fourth end portion and spans the transverse distance in the use position, the cross members thereby being selectively stowable when not in use to limit aerodynamic drag;

wherein the first, second, third and fourth end portions are substantially identical;

wherein the first roof rail has three walls that at least partially define a cavity between the three walls; and wherein the first cross member is configured to be nested within the cavity when in the stowed position so that the first roof rail surrounds the first cross member;

respective mounting mechanisms for supporting the respective first, second, third and fourth end portions at the respective roof rails, each mounting mechanism configured to be selectively slidable within the respective cavity along the respective roof rail to a selected cross member position and selectively lockable to the respective roof rail at the selected cross member position;

wherein each mounting mechanism includes a depressible button and a translatable pin displaced from the button; and wherein the translatable pin is configured to translate within a respective one of the first and the second cross member when the button is depressed and released to disconnect and connect said respective one of the first and the second cross member with a respective one of the first and the second roof rails, respectively.

7. The roof rack assembly of claim 6, further comprising:
a first and a second respective selective locking mechanism secured to the first and second roof rails, respectively, diagonally opposite one another to secure the second and fourth end portions, respectively, to the first and second roof rails when the cross members are in the stowed position, and to secure the fourth and second end portions, respectively, to the first and second roof rails, when the cross members are in the use position.

8. A roof rack assembly for supporting cargo on a vehicle roof, comprising:
a pair of elongated parallel roof rails spaced a distance from one another and configured to extend generally fore and aft on the vehicle roof;

a pair of cross members each having opposing end portions; wherein each of the roof rails at least partially defines a respective cavity enclosed on three sides by said each of the roof rails; wherein each of the cross members is pivotably secured to a different one of the roof rails at a respective one of the end portions diagonally opposite the other of the cross members and is pivotable between a stowed position to avoid aerodynamic drag and a use position to support cargo; wherein each of the cross members is configured to be nested in the respective cavity and to be substantially parallel with the roof rails and with the other cross member in the stowed position; and substantially perpendicular to the roof rails and parallel with the other cross member in the use position;

respective mounting mechanisms for supporting the respective end portions at the respective roof rails, each mounting mechanism configured to be selectively slidable within the respective cavity along the respective roof rail to a selected cross member position and selectively lockable to the respective roof rail at the selected cross member position;

wherein each mounting mechanism includes a depressible button and a translatable pin displaced from the button; and wherein the pin is configured to translate within the respective end portion when the button is depressed and released to disconnect and connect the respective end portion with the roof rail, respectively.

9. The roof rack assembly of claim 8, wherein the end portions of the cross members are substantially identical.

10. The roof rack assembly of claim 9, wherein the roof rails form lengthwise cavities configured to at least partially contain the cross members when in the stowed position.

11. The roof rack assembly of claim 10, wherein each of the mounting mechanisms includes a respective lever operatively connected to the respective translatable pin and configured to be movable to depress the respective translatable pin.

12. The roof rack assembly of claim 10, wherein each of the mounting mechanisms includes a respective wedge feature and a respective lever operatively connected to the wedge feature; and wherein moving the lever wedges the wedge feature to the respective roof rail to lock the respective cross member to the respective roof rail.

* * * * *